United States Patent
da Silva et al.

(10) Patent No.: US 11,259,287 B2
(45) Date of Patent: Feb. 22, 2022

(54) METHODS AND APPARATUS RELATING TO SYNCHRONIZATION SEQUENCE DETECTION IN A WIRELESS COMMUNICATION NETWORK

(71) Applicant: Telefonaktiebolaget LM Ericsson (publ), Stockholm (SE)

(72) Inventors: Icaro L. J. da Silva, Solna (SE); Rui Fan, Beijing (CN); Helka-Liina Määttanen, Helsinki (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/098,923

(22) PCT Filed: Jun. 15, 2018

(86) PCT No.: PCT/SE2018/050635
§ 371 (c)(1),
(2) Date: Nov. 5, 2018

(87) PCT Pub. No.: WO2018/231142
PCT Pub. Date: Dec. 20, 2018

(65) Prior Publication Data
US 2020/0100238 A1 Mar. 26, 2020

Related U.S. Application Data

(60) Provisional application No. 62/521,089, filed on Jun. 16, 2017.

(51) Int. Cl.
*H04W 72/04* (2009.01)
*H04L 5/00* (2006.01)
(Continued)

(52) U.S. Cl.
CPC ....... *H04W 72/0413* (2013.01); *H04L 5/0032* (2013.01); *H04W 24/10* (2013.01); *H04W 56/0015* (2013.01); *H04W 72/0446* (2013.01)

(58) Field of Classification Search
CPC ......... H04W 72/0413; H04W 72/0446; H04W 24/10; H04W 56/0015; H04W 48/20; H04W 16/28; H04L 5/0032
See application file for complete search history.

(56) References Cited

U.S. PATENT DOCUMENTS

2018/0302819 A1* 10/2018 Lee .................. H04B 7/0626
2018/0324780 A1* 11/2018 Novlan ............ H04L 43/0811
(Continued)

FOREIGN PATENT DOCUMENTS

WO 2018140190 A1 8/2018
WO 2018199655 A1 11/2018

OTHER PUBLICATIONS

Unknown, Author, "CSI-RS Design for L3 Mobility", 3GPP TSG RAN WG 1 Meeting #89, R1-1708165, Hangzhou, China, May 15-19, 2017, 1-4.
(Continued)

*Primary Examiner* — Habte Mered
(74) *Attorney, Agent, or Firm* — Christopher & Weisberg, P.A.

(57) ABSTRACT

The disclosure provides methods and apparatus relating to synchronization sequence detection in a wireless communication network. In one embodiment, a method is provided in a user equipment for a wireless communication network. A plurality of base stations are operative in the wireless communication network. The method comprises: detecting one or more parameters of synchronization sequence, SS,
(Continued)

blocks transmitted by a second base station of the plurality of base stations; and reporting the detected one or more parameters of SS blocks transmitted by the second base station to a first base station of the plurality of base stations.

26 Claims, 7 Drawing Sheets

(51) Int. Cl.
*H04W 24/10* (2009.01)
*H04W 56/00* (2009.01)

(56) References Cited

U.S. PATENT DOCUMENTS

| | | | | |
|---|---|---|---|---|
| 2019/0132759 A1* | 5/2019 | Park | .................... | H04W 56/001 |
| 2019/0349960 A1* | 11/2019 | Li | ..................... | H04W 72/1242 |
| 2020/0022040 A1* | 1/2020 | Chen | .................. | H04W 56/001 |
| 2020/0053608 A1* | 2/2020 | Tao | ................... | H04W 36/0094 |
| 2020/0059810 A1* | 2/2020 | Harada | ............. | H04W 56/0015 |
| 2020/0067673 A1* | 2/2020 | Luo | ...................... | H04B 7/0626 |
| 2020/0068420 A1* | 2/2020 | Chen | ..................... | H04W 36/00 |
| 2020/0187159 A1* | 6/2020 | Ko | ...................... | H04W 72/005 |

OTHER PUBLICATIONS

Unknown, Author, "Discussion and evaluation on NR RRM measurement based on SS block", 3GPP TSG RAN WG1 Meeting #89, R1-1708444, Hangzhou, P.R. China, May 15-19, 2017, 1-8.

Unknown, Author, "Measurement configuration for IDLE RS", 3GPP TSG-RAN WG2 #98, Tdoc R2-1704104, Hangzhou, P.R. of China, May 15-19, 2017, 1-5.

Unknown, Author, "Measurement framework in NR", 3GPP TSG RAN WG2 Meeting #98, R2-1704767, Hangzhou, China, May 15-19, 2017, 1-3.

Unknown, Author, "DL Beam Management Details", 3GPP TSG RAN WG1 Meeting #89, R1-1707750, Hangzhou, China, May 15-19, 2017, pp. 1-4.

Unknown, Author, "Indication of SS block timing information", 3GPP TSG RAN WG1 Meeting #89, R1-1708304, Hangzhou, P. R. China, May 15-19, 2017, pp. 1-5.

EPO Communication dated Sep. 9, 2021 for Patent Application No. 18818403.0, consisting of 5-pages.

* cited by examiner

METHODS AND APPARATUS RELATING TO SYNCHRONIZATION SEQUENCE DETECTION IN A WIRELESS COMMUNICATION NETWORK

TECHNICAL FIELD

Embodiments of the present disclosure relate to methods and apparatus in a wireless communication network, and particularly to methods and apparatus relating to the detection of synchronization sequence blocks in a wireless communication network.

BACKGROUND

In Long Term Evolution (LTE), until Release 13, all reference signals that the user equipment (UE) uses for channel state information (CSI) calculation (e.g. cell-specific reference signals, CRSs, and CSI reference signals, CSI-RS), were non-precoded such that the UE is able to measure the raw channel and calculate feedback including a preferred precoding matrix based on that. As the number of Tx antennas increases, the amount of feedback becomes larger. In Release-10, when support for 8Tx closed loop precoding was introduced, a double codebook approach was introduced where the UE first selects a wideband coarse precoder and then per subband a second codeword. Another possible approach is that the network node beamforms a reference signal and the UE calculates feedback on top of that. This approach was adopted in Rel-13, while a further option for FD-MIMO (full-dimension multiple-input-multiple-output, where the antenna system can form a beam along any horizontal or vertical direction) was also defined as described in the next section.

Rel-13 FD-MIMO specification in LTE supports an enhanced CSI-RS reporting called Class B for beamformed CSI-RS. Therein, an LTE RRC_CONNECTED UE can be configured with K beams (where 8>K>1) where it can be 1, 2, 4 or 8 antenna ports for each beam. For CSI feedback purposes (i.e. precoding matrix indicator, PMI, rank indicator, RI and channel quality indicator, CQI) there is a CSI-RS Resource Indicator per CSI-RS. The UE reports the CSI-RS index (CRI) to indicate the preferred beam where the CRI is wideband, RI/CQI/PMI is based on legacy codebook (i.e. Rel-12) and CRI reporting period is an integer multiple of the RI. For Rel-14 eFD-MIMO (i.e. enhanced FD-MIMO), aperiodic CSI-RS was introduced with two different sub-flavors. The CRS-RS resources are configured for the UE as in Rel-13 and the set of K CSI-RS resources is configured to work as aperiodic or semipersistent. The UE waits for media access control (MAC) control element (CE) activation for N out of K CSI-RS resources (where N≤K). For aperiodic CSI-RS, the UE waits for, in addition to the MAC CE, a downlink control information (DCI) activation of the CSI-RS resource before reporting. For semi-persistent CSI-RS, the UE considers the CSI-RS activated after receiving the MAC CE.

Figure 1:
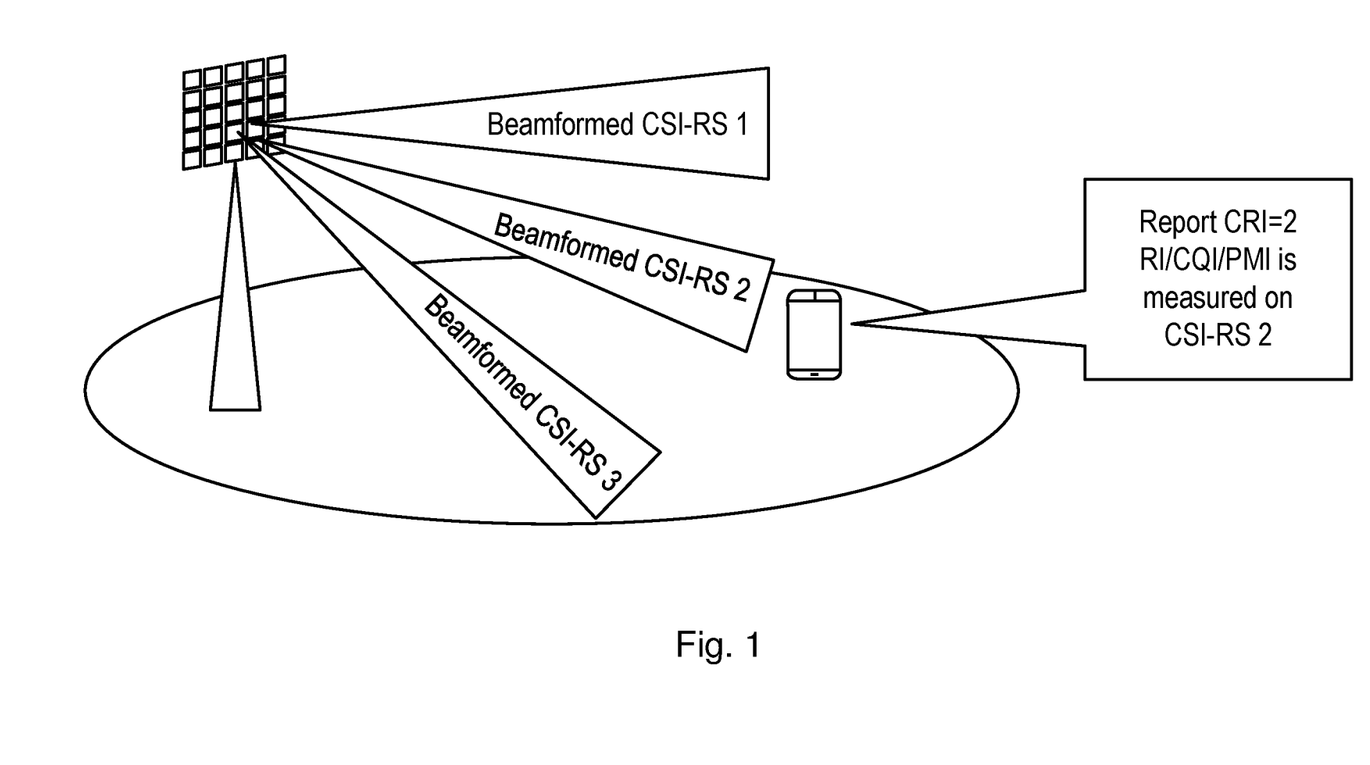
FIG. 1 illustrates the transmission of beamformed reference signals from a transmission point to a wireless terminal device.

FIG. 1 shows the transmission of beamformed reference signals (e.g. CSI-RS) from a transmission point to a wireless terminal device. The transmission point may be a radio-access network node, such as an eNodeB or a gNodeB, or a remote radio head associated with such a radio-access network node.

Efforts are on-going to develop and standardize communications networks and protocols intended to meet the requirements set out for the fifth generation (5G) of wireless systems, as defined by the Next Generation Mobile Networks Alliance. In the new system (also known as "New Radio" or "NR"), all reference signals may be beamformed.

In NR, the synchronization sequences (NR-PSS/NR-SSS) and physical broadcast channel (PBCH) which includes demodulation reference signal (DMRS) constitutes a so-called SS Block. An RRC_CONNECTED UE trying to access a target cell should assume that the SS Block may be transmitted in the form of repetitive bursts of SS Block transmissions (denoted "SS Burst"), wherein such a burst consists of a number of SS Block transmissions following close after each other in time. Furthermore, a set of SS Bursts may be grouped together (denoted "SS Burst Set"), where the SS Bursts in the SS Burst Sets are assumed to have some relation to each other. Both SS Bursts and SS Burst Sets have their respective given periodicity. In the single beam scenarios, the network could configure time-repetition within one SS Burst in a wide beam. In multi-beam scenarios, at least some of these signals and physical channels (e.g. SS Block) would be transmitted in multiple beams, which could be done in different manners depending on network implementation, as shown in FIG. 1.

Figure 2:
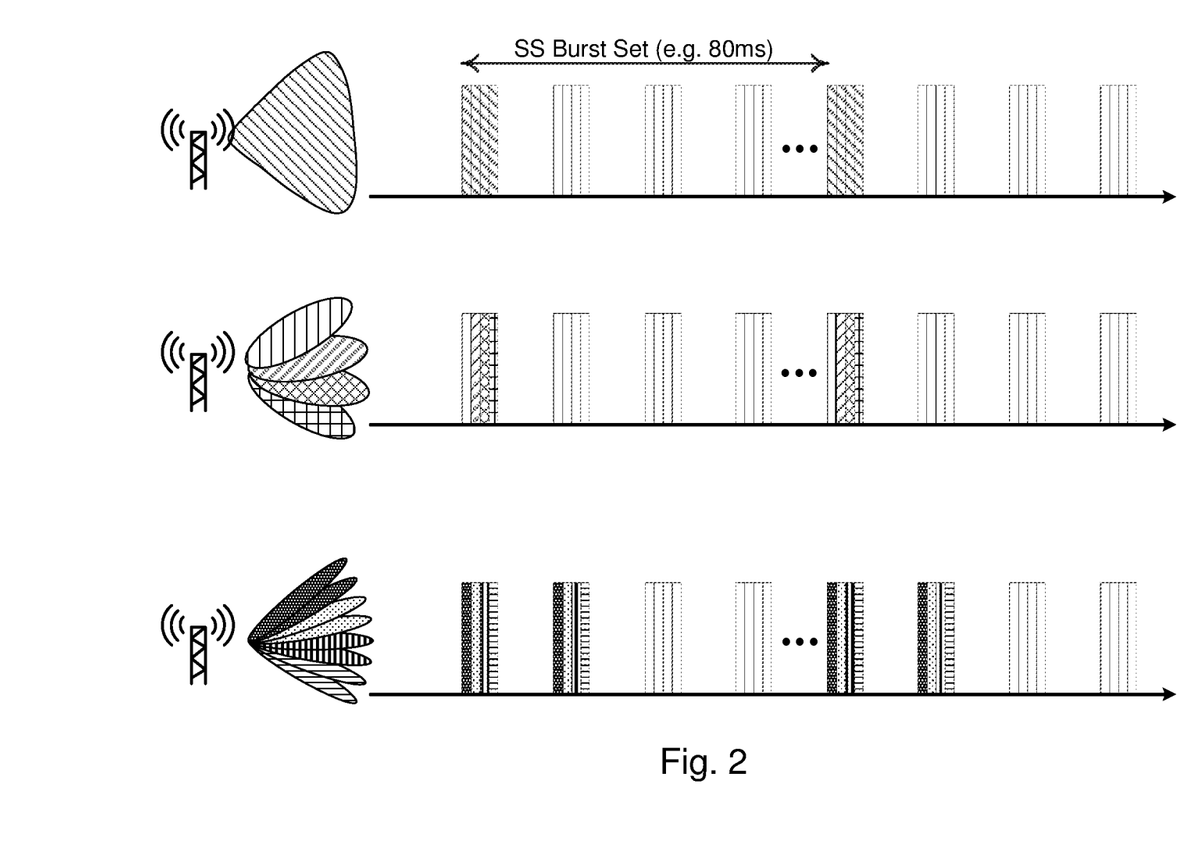
FIG. 2 illustrates the transmission of synchronization sequences according to different configurations.

FIG. 2 shows different configurations of an SS Burst Set. Top: Time-repetition within one SS Burst in a wide beam. Middle: Beam-sweeping of a small number of beams using only one SS Burst in the SS Burst Set. Bottom: Beam-sweeping of a larger number of beams using more than one SS Burst in the SS Burst Set to form a complete sweep.

Which of these three alternatives to implement may be left as a network vendor choice. That choice depends on a tradeoff between i) the overhead caused by transmitting periodic and always on narrow beam sweepings vs. ii) the delays and signaling needed to configure the UE to find a narrow beam for the physical downlink shared channel (PDSCH) or the physical downlink control channel (PDCCH). The implementation shown in the upper figure prioritizes i), while the implementation shown in the bottom figure prioritizes ii). The figure in the middle case is an intermediate case, where a sweeping of wide beams is used. In that case the number of beams to cover the cell is reduced, but in some cases an additional refinement is needed for narrow gain beamforming of PDSCH.

It is likely that network vendors will provide cell coverage with a low number of beams for the IDLE mode coverage which could imply a fairly low number of SS Blocks per Burst Set. Hence, once the UE accesses a cell using a random-access procedure, either via state transition to CONNECTED or via handovers, further beam management procedures need to be configured and DL beams to be used for the transmission of PDCCH/PDSCH may need to be further refined.

For that purpose, RAN1 is defining in NR a CSI-RS framework for the so called beam management and CSI acquisition procedures or transmission point (TRP) recognition in same cell ID scenarios. The same cell ID scenario is equivalent to one of the LTE CoMP scenarios where concept of transmission point TP was introduced. A TP/TRP is basically a remote radio head (RRH) and all RRHs have same cell ID within one cell area. This means that they all send the same CRS (in LTE) or SS bursts (in NR) and therefore CSI-RS is the only means for the UE to separate a TP/TRP.

One relevant assumption for NR compared to LTE is the fact that in LTE, the synchronization signals PSS/SSS that the UE is supposed to find during cell search are always transmitted in a unique part of a given frequency carrier, more precisely the center of the carrier frequency. Hence, by configuring the UE with a measurement object, MO, which is associated to a given carrier frequency the UE immediately knows that it should search for cells in the center of the configured carrier. As will be understood by those skilled in the art, a measurement object is a logical object defining one or more measurements to be carried out by a UE. For example, the measurement object may define one or more of: one or more radio resources on which measurements are to be made (e.g., frequencies, time slots, etc), and one or more types of measurement to be carried out (e.g., serving cells, neighbouring cells, etc). A UE may be configured with one or more such measurement objects.

However, in NR, it has been agreed that for a given carrier frequency the network has the possibility to transmit in multiple frequency locations, different from LTE. It could also be possible, although not yet agreed, that even multiple instances of SS Burst or SS burst sets are transmitted in the same carrier in different frequency locations, instead of the center frequency, or the frequency position is different between different carriers.

One problem addressed by embodiments of the disclosure is that the radio access node configuring the measurements (e.g. the serving radio access node) does not know the time and frequency position of the SS burst set in order to be able to configure UEs with SS burst timing information.

This is particularly problematic if the UE needs to search, find and measure on cells which do not share the time and frequency position of SS bursts with the serving radio access node.

SUMMARY

One aspect of the disclosure provides a method in a user equipment for a wireless communication network. A plurality of base stations are operative in the wireless communication network. The method comprises: detecting one or more parameters of synchronization sequence, SS, blocks transmitted by a second base station of the plurality of base stations; and reporting the detected one or more parameters of SS blocks transmitted by the second base station to a first base station of the plurality of base stations.

Another aspect of the disclosure provides a method in a first base station operative in a wireless communication network. The method comprises: instructing a terminal device to detect and report one or more properties of synchronization sequence, SS, blocks transmitted by a base station node operative in the wireless communication network; and receiving, from the terminal device, a report comprising the detected one or more properties of SS blocks transmitted by the second base station.

Further aspects provide apparatus and machine-readable mediums comprising instructions for performing the methods set out above.

For example, in one aspect, there is provided a user equipment for a wireless communication network. The user equipment comprises processing circuitry and a non-transitory machine-readable medium storing instructions which, when executed by the processing circuitry, cause the user equipment to: detect one or more parameters of synchronization sequence, SS, blocks transmitted by a second base station; and report the detected one or more parameters of SS blocks transmitted by the second base station to a first base station.

In another aspect, there is provided a base station for a wireless communication network. The base station comprises processing circuitry and a non-transitory machine-readable medium storing instructions which, when executed by the processing circuitry, cause the base station to: instruct a user equipment to detect and report one or more properties of synchronization sequence, SS, blocks transmitted by a second base station operative in the wireless communication network; and receive, from the user equipment, a report comprising the detected one or more properties of SS blocks transmitted by the second base station.

The apparatus may also be implemented using one or more modules. The modules may be implemented in hardware, in software, or in a combination of hardware and software.

A further aspect provides a method where a UE is configured to search SS block properties from at least one carrier or cell, wherein the UE is configured to i) Detect the properties of SS Block Sets such as timing of the start of the SS block set compared to timing of a reference (e.g. serving cell system frame number), periodicity of SS block set(s), number of SS Block Burst per Set, number of SS Blocks per burst, periodicity of SS block burst within an SS block set and frequency location or locations (if multiple) within the configured carrier or cell ii) Report these properties, together with a cell identifier to the serving radio access node via an established connection (e.g. dedicated RRC signaling over SRB1).

It has been agreed by the RAN1 working group in 3GPP that if the periodicity is not informed to the UE, UE may assume 5 ms periodicity which from the network side can be excessive from an overhead perspective.

Other consequences regarding connected mode UE if the current 5 ms periodicity default assumption will be later removed, or regardless, for idle mode UE for cell reselection are that the UE will need to have long or default measurement window duration/periodicities, or equivalent for cell reselection, and that the UE will have to test multiple frequency hypotheses for a given carrier frequency/MO that was configured, or where UE tries to reselect a cell.

Note that the discussion below focuses on a technical solution for networks intended to meet the requirements set out for the fifth generation (5G) of wireless systems, as defined by the Next Generation Mobile Networks Alliance. However, those skilled in the art will appreciate that it is also possible to apply the methods and apparatus described herein to other networks and access technologies. In other networks, nodes and interfaces may have different names.

BRIEF DESCRIPTION OF THE DRAWINGS

For a better understanding of the present disclosure, and to show how it may be put into effect, reference will now be made, by way of example, to the accompanying drawings, in which.

DETAILED DESCRIPTION

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as to not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for a wireless terminal device, or user equipment (UE), it should be understood by the skilled in the art that "UE" is a non-limiting term comprising any mobile or wireless device, terminal or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile station" ("MS"), "mobile device", "terminal device" and "wireless terminal device" may be used interchangeably in the following description, and it will be appreciated that such a device does not necessarily have to be 'mobile' in the sense that it is carried by a user. Examples of UE are target device, device to device (D2D) UE, machine type UE or UE capable of machine to machine (M2M) communication, PDA, tablet computer, mobile terminals, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrowband Internet of Things (NB-IoT) UE, UE Cat NB1, etc.

In some embodiments a more general term "network node" is used and it can correspond to any type of radio access node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT, test equipment, etc. Moreover, where the following description refers to steps taken in or by a network node or a radio access node, this also includes the possibility that some or all of the processing and/or decision making steps may be performed in a device that is physically separate from the radio antenna of the node, but is logically connected thereto. Thus, where processing and/or decision making is carried out "in the cloud", the relevant processing device is considered to be part of the node for these purposes.

The embodiments are described for LTE or LTE based systems such as machine-type communication (MTC), evolved MTC (eMTC), NB-IoT etc. As an example MTC UE, eMTC UE and NB-IoT UE also called UE category 0, UE category M1 and UE category NB1. However, the embodiments are applicable to any RAT or multi-RAT systems, where the UE receives and/or transmit signals (e.g. data) e.g. LTE FDD/TDD, WCDMA/HSPA, GSM/GERAN, Wi-Fi, WLAN, CDMA2000, 5G, NR, etc. It is recalled that 5G, the fifth generation of mobile telecommunications and wireless technology is not yet fully defined but in an advanced draft stage within 3GPP. It includes work on 5G New Radio (NR) Access Technology. LTE terminology is used in this disclosure in a forward looking sense, to include equivalent 5G entities or functionalities although a different term is specified in 5G. A general description of the agreements on 5G New Radio (NR) Access Technology so far is contained in most recent versions of the 3GPP 38-series Technical Reports.

Figure 3:
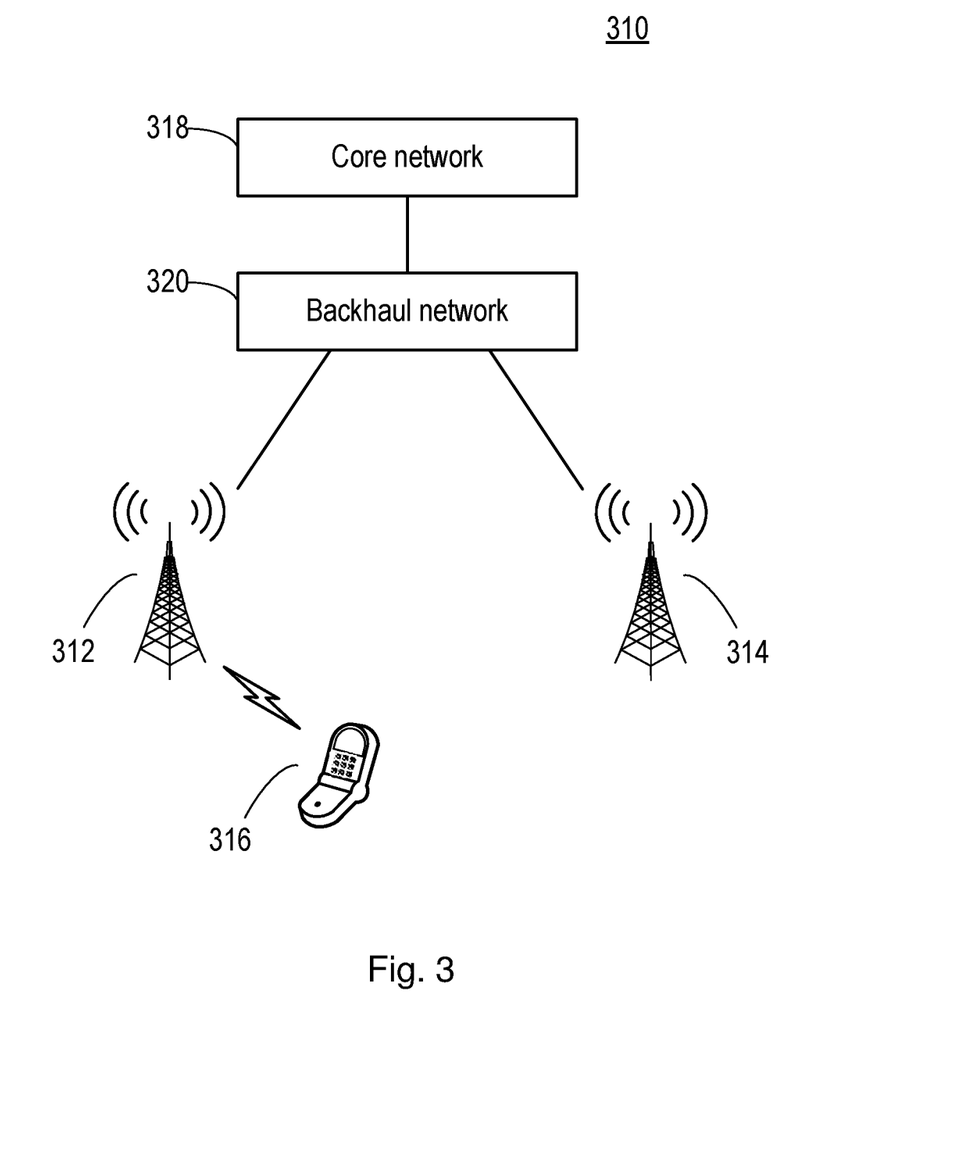
FIG. 3 shows a network according to embodiments of the disclosure.

FIG. 3 illustrates a network 310 that may be utilized to explain the principles of embodiments of the present disclosure. The network 310 comprises network nodes 312, 314 which are connected, via a backhaul network 320, to a core network 318. FIG. 3 also shows a terminal device (or UE, wireless terminal, etc) 316 that is in wireless communication with the network node 312. Messages transmitted by the terminal device 316 to the network node 312 are said to be transmitted in the "uplink", while messages transmitted by the network node 312 to the terminal device 16 are said to be transmitted in the "downlink". Thus, network node 312 may be termed a serving node for the terminal device 316.

Although the terminal device 316 is illustrated as a mobile phone, or smartphone, it will be understood by those skilled in the art that the terminal device may be any device that is configured for communication with the wireless communication network 310.

The network nodes 312, 314 may be of a type referred to as e.g. radio access nodes, base stations, NodeBs, evolved NodeBs (eNB, or eNodeB), gNodeBs, base transceiver stations, Access Point Base Stations, base station routers, Radio Base Stations (RBSs), macro base stations, micro base stations, pico base stations, femto base stations, Home eNodeBs, relays and/or repeaters, transmission points, beacon devices or any other network node configured for communication with wireless devices over a wireless interface, depending e.g. on the radio access technology and terminology used.

Network node 314 may be a neighbouring radio access node to network node 312, and thus signals transmitted by the network node 314 may also be detected by the terminal device 316. Those signals may interfere with transmissions between the serving node or cell and the terminal device 316. However, in some embodiments the terminal device 316 may be configured to communicate with both nodes 312, 314. For example, the serving node 312 may establish a serving cell, serving carrier, primary cell or primary carrier (PCell), as well as one or more additional cells or carriers; the second node 314 may establish a secondary cell or carrier (SCell) to provide service to the terminal device 316. Thus there are multiple circumstances in which it is beneficial for the terminal device 316 to be able to detect and measure transmissions by the second network node 314: to mitigate interference caused by transmissions of the second network node 314; and to identify and communicate with the second network node 314.

The network nodes 312, 314 may transmit signals via a respective pluralities of beams. One or more of the beams may be relatively wide, and extend from the network node in substantially all directions. Conversely, one or more of the beams may be relatively narrow (e.g. through the use of beam-forming techniques), and extend from the network node in a particular direction. The plurality of beams may comprise multiple such narrow beams, configured to extend from the network node in different directions. The network nodes 312, 314 may transmit synchronization sequence (SS) signals as described above with respect to FIG. 2.

In order to discover the second network node quickly, the first network node may provide the terminal device 316 (or, generally, any terminal device which it serves) with one or more parameters describing the SS block transmissions by the second network node (such as the time and frequency of such transmissions). However, in general the serving node 312 does not have that information.

Accordingly, embodiments of the disclosure provide methods and apparatus whereby a terminal device is configured to detect one or more parameters relating to the SS block transmissions of a second radio access node, and report those detected parameters to a first radio access node (e.g. the serving radio access node). In the example of FIG. 3, therefore, the network node 312 may instruct the terminal device 316 to detect and report one or more parameters relating to the SS block transmissions of network node 314. In this way, the network node 312 learns of the SS transmission parameters and can inform other terminal devices which it serves (e.g. to enable easier detection of the SS transmissions of the network node 314).

Figure 4:
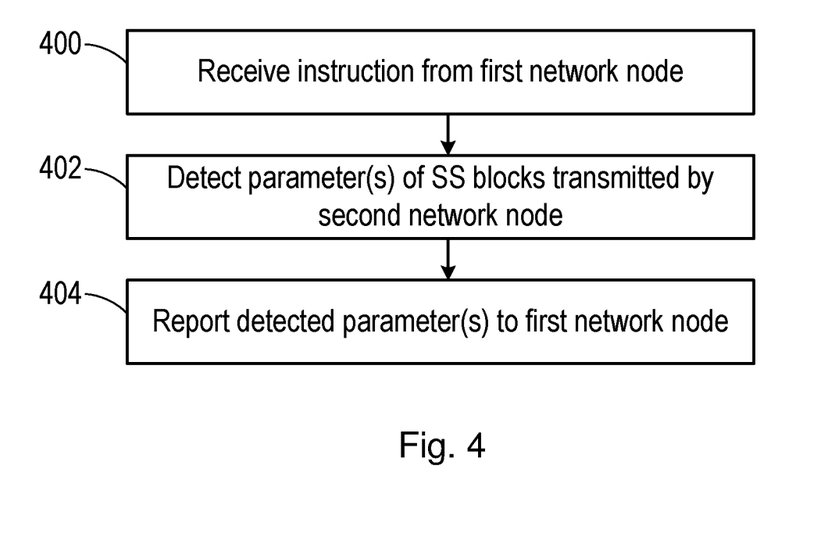
FIG. 4 is a flow chart of a method in a terminal device according to embodiments of the disclosure.

FIG. 4 is a flowchart of a method according to embodiments of the disclosure. The method may be carried out in a terminal device, such as the terminal device 316 described above.

In step 400, the terminal device receives an instruction from a first network node (which may be a serving radio access node for the terminal device). The instruction may instruct the terminal device to detect and report one or more parameters of the SS blocks transmitted by a second network node. Note that the second network node may or may not be addressed specifically by way of the instruction. For example, the instruction may comprise an indication of a particular second network node or nodes (or correspondingly a particular cell or cells) for which parameters should be detected and reported. Alternatively, the instruction may instruct the terminal device merely to detect and report one or more parameters of any SS blocks transmitted by second network nodes generally (i.e. any network nodes which are different than the first network node and for which SS blocks are detectable). In the latter case, the instruction may indicate a particular frequency or frequencies on which measurements should be made by the terminal device. In the former case, the terminal device may ignore for some samples at least the configured measurement window measRS-Config, also provided in the MO.

The instruction may be received wirelessly from the first network node (e.g. such as via radio resource control, RRC, signaling).

The instruction may comprise a request message, to which the terminal device can transmit a response message comprising the detected data (see FIG. 6, below). Alternatively, the instruction may comprise a measurement configuration, configuring the terminal device to detect the parameters and report the detected parameters regularly (i.e. periodically) or on an event-triggered basis (e.g. in response to detection of a new cell). The configuration may be persistent or semi-persistent. The configuration may comprise an indication of one or more measurement objects (MOs), with each MO corresponding to a particular frequency or frequencies, or a particular cell or cells. See FIG. 7 for an example of this embodiment.

The instruction may comprise an indication of the one or more parameters that should be detected and reported. The indication may be explicit, with the instruction indicating the one or more parameters that should be detected and reported. Alternatively, the indication may be implicit, with the indication comprising a subset of parameters from a known list of parameters. In that case, the terminal device may be instructed to detect and report one or more of the missing parameters.

The level of granularity can also differ. For example, the network may indicate a set or subset of cells per MO while the terminal device could be configured to detect and report per cell for each MO configured for that purpose. The terminal device may also detect (or be configured to detect) a parameter which is already provided by the network node in order to determine whether or not the network information needs to be updated.

In one embodiment the parameters may relate to time and frequency properties of the SS block transmissions (i.e. the time and frequency or frequencies of the transmissions). For example, the one or more parameters may comprise one or more of: a start time of the SS burst set compared to a timing reference; periodicity of SS burst sets; the number of SS Bursts per SS burst set; the number of SS blocks per SS burst; the periodicity of SS bursts within an SS burst set; and one or more frequencies over which the SS blocks are transmitted. The timing reference may comprise a system frame number for the first network node, or other fixed timing reference point for transmissions by the first network node.

The instruction may be a message defined for that particular purpose or an existing message (such as an existing RRC message) with one or more new parameters whose presence indicates that the UE should perform the detecting and reporting actions.

The instruction may also configure for how long and how many times the terminal device should perform the detection and/or reporting procedures.

The UE is configured with measurement object to measure certain frequency and/or cells. The measurement configuration may contain only a limited information about the SS burst set the UE should search, find, measure, evaluate the triggering conditions for events and report.

In step 402, the terminal device detects the one or more parameters of SS blocks transmitted by one or more second network nodes. The detection may take place at any time, periodically, or in response to some event (such as detection of a new cell, or initiation of a cell-search procedure, e.g. upon a determination that the quality of signals from the first network node has fallen below a threshold).

For example, in order to determine timing of the SS block transmissions, in one embodiment the terminal device may listen for the transmission of SS blocks during a finite time window.

The finite time window may have a length equal to a sum of a maximum permitted periodicity and an additional time duration. The additional time duration may take a value between 0 and the maximum permitted periodicity. Thus the finite time window may have a length between the maximum permitted periodicity and twice the maximum permitted periodicity.

The maximum permitted periodicity may be configured by the network node. The additional time duration may also be configured by the serving network node. Alternatively, the additional time duration may be determined by the terminal device. For example, if the first and second network nodes are known to be synchronized, the additional time duration may be set to 0, or close to 0.

The start of the finite time window may be timed to coincide with an SS block transmitted by a serving network node (e.g. the first network node).

Thus in one embodiment the terminal device uses a time window where the starting point is at its own best SS Block index and the time window duration is equal to a DELTA+X*maximumAllowedPeriodicityPerCarrier for the configured carrier (where DELTA is the additional time duration referred to above). If the max periodicity for the configured carrier is 40 ms, for example, in order to discovery the SS burst set periodicity of a given cell within the carrier, the window may remain open for at least longer than 1 period i.e. 40 ms+DELTA. The DELTA value, referring to the SS burst timing of serving cell, can be 0 if the terminal device is aware that the nodes are synchronized. Otherwise, in the worst case scenario, DELTA=maximumAllowedPeriodicityPerCarrier and the overall duration is set to 2*maximumAllowedPeriodicityPerCarrier.

The length of the finite time window may also take into account RX beam sweeping aspects at the terminal device. For each Tx beam the terminal device could use one of its Rx beams. Hence the previous described operation could be repeated for multiple Rx beams, and the window duration could be DELTA+X*maximumAllowedPeriodicityPerCarrier*numberUERx Beams. It should be noted that one possible alternative is that the terminal device could start with a shorter time window and increment until it can detect the required cells and their properties.

Thus the terminal device may be able to determine the periodicity of an SS burst set as well as the initial timing.

In further embodiments step 402 may comprise the terminal device listening for the transmission of SS blocks on multiple frequencies.

For example, the terminal device may test multiple frequency location (fc) possibilities per configured carrier or per MO, by previously knowing which possible fc's can be set per carrier and whether multiple ones may exist or not. The terminal device may test multiple frequencies during the finite time window, so as to determine frequency and timing aspects of the SS transmissions concurrently.

In further embodiments, step 402 may comprise the terminal device determining the one or more parameters based on system information transmitted by the second radio access node.

For example, the terminal device may not be able to detect all burst or all beams within a burst, and therefore may be unable to determine the number of SS Bursts per Set or the number of SS Blocks per burst. Hence in some embodiments, the terminal device may acquire that information by reading the neighbour cell's system information, which could either be transmitted on system information blocks (SIBs) or master information blocks (MIB).

In order to save power, the terminal device may halt further blind detection of particular SS transmissions, cells, or network nodes, etc, upon the terminal device determining how to read the physical broadcast channel (PBCH) or MIB and SIB from the particular neighbour cell/frequency. At that point, the terminal device may be able to determine any missing properties or parameters by receiving the MIB/SIB from the neighbour cell/frequency.

Similarly, if the terminal device is required to detect just the SS transmission properties of a specific cell or cells, the terminal device may stop its blind detection altogether once it detects the specific cell and obtains the required properties.

In step 404, the terminal device reports the detected parameter(s) to the first network node. For example, step 404 may comprise the terminal device transmitting a report message to the first network node (e.g. an RRC message). The report message may be a specific message defined for the purpose of SS parameter reporting.

The reporting may be a response to a request message received in step 400, or a configured report (e.g. an event-triggered report or a periodic report). Alternatively, the terminal device may report upon data from step 402 becoming available.

The report message may comprise the detected properties per cell (if different detected cells have different properties), per MO, and/or per carrier. In the case of event-triggered reports, the report message may include the SS parameter information of detected cells that triggered the event (e.g. at least once per cell and/or per carrier). If the same cell fulfils criteria multiple times the terminal device may not include the same SS properties for the same cell multiple times in the measurement report.

The report message may also include SS information for cells that have not triggered the measurement events, at least once per cell.

Figure 5:
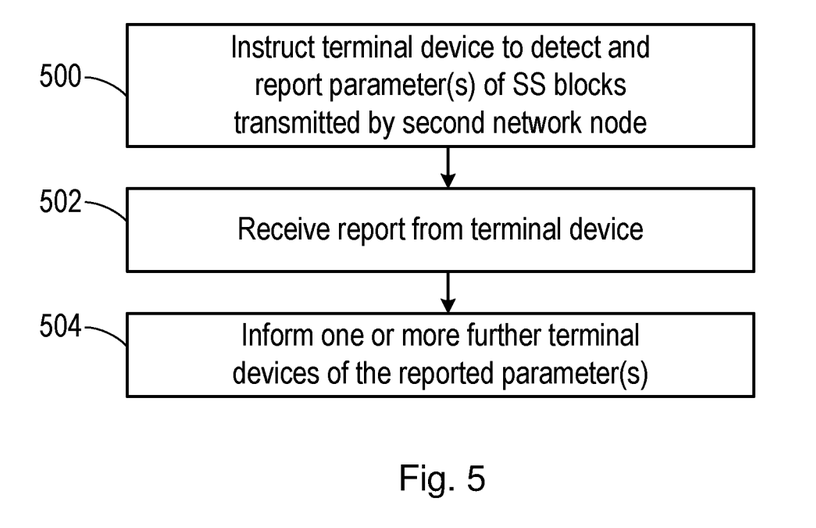
FIG. 5 is a flow chart of a method in a network node according to embodiments of the disclosure.

FIG. 5 is a flowchart of a method according to embodiments of the disclosure. The method may be carried out in a network node. For example, the network node may be a radio access node, such as the network node 312 described above. Alternatively, the network node may be coupled to such a radio access node, and configured to control that radio access node and/or to receive communications received by the radio access node.

The method begins in step 500, in which the network node (also referred to as the first network node) instructs a terminal device to detect and report parameter(s) of SS blocks transmitted by one or more second network nodes.

The instruction may instruct the terminal device to detect and report one or more parameters of the SS blocks transmitted by a second network node. Note that the second network node may or may not be addressed specifically by way of the instruction. For example, the instruction may comprise an indication of a particular second network node or nodes (or correspondingly a particular cell or cells) for which parameters should be detected and reported. Alternatively, the instruction may instruct the terminal device merely to detect and report one or more parameters of any SS blocks transmitted by second network nodes generally (i.e. any network nodes which are different than the first network node and for which SS blocks are detectable). In the latter case, the instruction may indicate a particular frequency or frequencies on which measurements should be made by the terminal device.

The instruction may be transmitted wirelessly by the first network node, for example via radio resource control, RRC, signaling.

The instruction may comprise a request message, to which the terminal device can transmit a response message comprising the detected data (see FIG. 6, below). Alternatively, the instruction may comprise a measurement configuration, configuring the terminal device to detect the parameters and report the detected parameters regularly (i.e. periodically) or on an event-triggered basis (e.g. in response to detection of a new cell). The configuration may be persistent or semi-persistent. The configuration may comprise an indication of one or more measurement objects (MOs), with each MO corresponding to a particular frequency or frequencies, and/or a particular cell or cells. See FIG. 7 for an example of this embodiment.

The instruction may comprise an indication of the one or more parameters that should be detected and reported. The indication may be explicit, with the instruction indicating the one or more parameters that should be detected and reported. Alternatively, the indication may be implicit, with the indication comprising a subset of parameters from a known list of parameters. In that case, the terminal device may be instructed to detect and report one or more of the missing parameters.

The level of granularity can also differ. For example, the instruction may indicate a set or subset of cells per MO while the terminal device could be configured to detect and report per cell for each MO configured for that purpose. The terminal device may also detect (or be configured to detect) a parameter which is already provided by the network node in order to determine whether or not the network information needs to be updated.

In one embodiment the parameters may relate to time and frequency properties of the SS block transmissions (i.e. the time and frequency or frequencies of the transmissions). For example, the one or more parameters may comprise one or more of: a start time of the SS burst set compared to a timing reference; periodicity of SS burst sets; the number of SS Bursts per SS burst set; the number of SS blocks per SS burst; the periodicity of SS bursts within an SS burst set; and one or more frequencies over which the SS blocks are transmitted. The timing reference may comprise a system frame number for the first network node, or other fixed timing reference point for transmissions by the first network node.

The instruction may be a message defined for that particular purpose or an existing message (such as an existing RRC message) with one or more new parameters whose presence indicates that the UE should perform the detecting and reporting actions.

The instruction may also configure for how long and how many times the terminal device should perform the detection and/or reporting procedures.

The terminal device may be configured with one or more measurement objects to measure a certain frequency or frequencies and/or cells. The measurement configuration may contain only a limited information about the SS burst set that the terminal device should search, find, measure, evaluate the triggering conditions for events and report.

The instruction may comprise an indication of one or parameters that should be used by the terminal device for the purposes of detecting the SS parameters. For example, the instruction may comprise an indication of the maximum permitted periodicity, or the additional time duration (DELTA). Alternatively, these parameters may be configured via other signaling (such as system information or RRC signaling).

The network node may also configure the terminal device to trigger the report of SS properties only when the terminal device detects that a change in the SS properties has occurred. That can be based on a default SS block configuration per MO i.e. the terminal device assumes default properties and identifies that a given cell or cells in configured MO have different properties. Then, responsive to this detection, the terminal device triggers the reporting of this updated SS block information. The network node may configure the terminal device to send this information in an "empty" measurement report i.e. not triggered by any measurement event A1-A6/Cx but by the detection of differences in these properties.

In step 502, the first network node receives a report message from the terminal device. The report message may comprise an RRC message. The report message may be a specific or dedicated message defined for the purpose of SS parameter reporting.

The report message may be a response to a request message transmitted in step 500, or a configured report (e.g. an event-triggered report or a periodic report). Alternatively, the terminal device may report upon data becoming available.

The report message may comprise the detected properties per cell (e.g., if different detected cells have different properties) and/or per carrier. In the case of event-triggered reports, the report message may include the SS parameter information of detected cells that triggered the event (e.g. at least once per cell and/or per carrier). If the same cell fulfils criteria multiple times the terminal device may not include the same SS properties for the same cell multiple times in the measurement report.

The report message may also include SS parameter information for cells that have not triggered the measurement events, at least once per cell.

In step 504, the first network node informs one or more further terminal devices (e.g. one or more further terminal devices served by the first network node) of the parameters reported in the report received in step 502. For example, the information may be included in dedicated signaling (e.g. RRC signaling) to the one or more further terminal devices, or broadcast to multiple terminal devices (e.g. in system information). The further terminal device(s) may thereafter use the information to discover, synchronize with, and connect to the second network node(s). Alternatively, the further terminal device(s) may utilize the information to avoid or mitigate interference from signals transmitted by the second network node(s).

Figure 6:
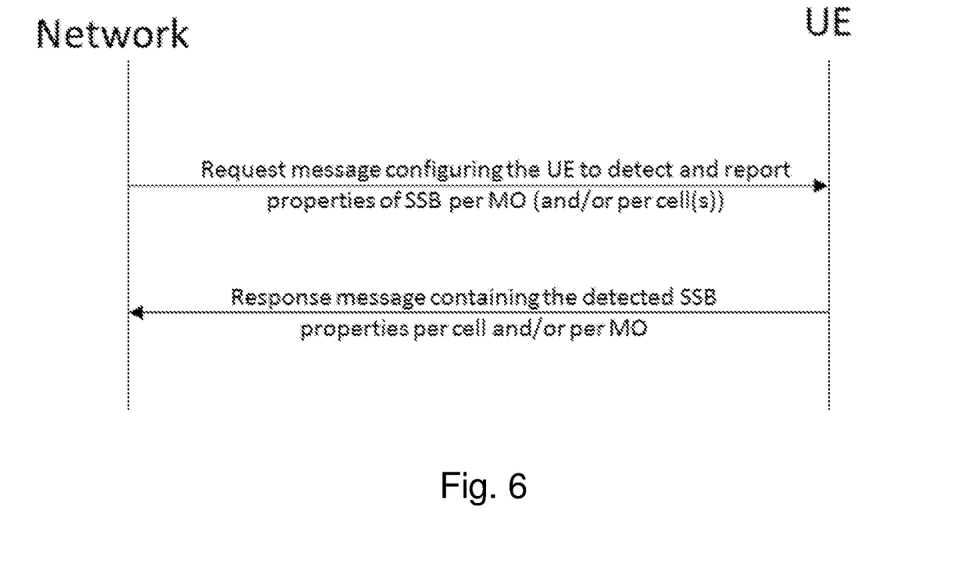
FIG. 6 is a signaling diagram according to embodiments of the disclosure.

FIG. 6 is a signaling diagram according to embodiments of the disclosure, illustrating signaling between a terminal device (e.g. UE) and a network node (e.g. Network).

A first transmission, from the network node to the terminal device, comprises a request message instructing or configuring the terminal device to detect and report properties of synchronization sequence blocks (e.g. synchronization sequence blocks transmitted by other network nodes). For example, the request message may instruct the terminal device to detect and report properties of synchronization sequence blocks according to a measurement object (MO), defining one or more frequencies on which the terminal device should detect the properties of synchronization sequence blocks, and/or one or more cells on which the terminal device should detect the properties of synchronization sequence blocks.

A second transmission, from the terminal device to the network node, comprises a report message containing the detected synchronization sequence block parameters or properties. The report message may comprise a response message to the request message.

Figure 7:
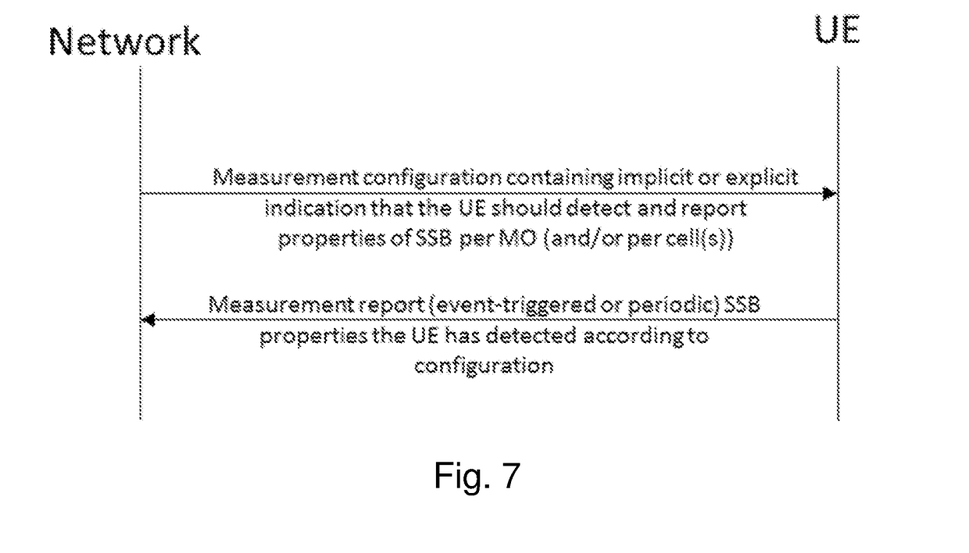
FIG. 7 is a signaling diagram according to further embodiments of the disclosure.

FIG. 7 is a signaling diagram according to further embodiments of the disclosure, illustrating signaling between a terminal device (e.g. "UE" in the diagram) and a network node (e.g. "Network" in the diagram).

A first transmission, from the network node to the terminal device, comprises a measurement configuration, containing an implicit or explicit instruction that the terminal device should detect and report properties of synchronization sequence blocks (e.g. synchronization sequence blocks transmitted by other network nodes). For example, the measurement configuration may instruct the terminal device to detect and report properties of synchronization sequence blocks according to a measurement object (MO), defining one or more frequencies on which the terminal device should detect the properties of synchronization sequence blocks, and/or one or more cells on which the terminal device should detect the properties of synchronization sequence blocks.

The measurement configuration may further comprise an indication of one or more events that trigger the reporting of detected SS block parameters, or an indication of a period of such reporting.

A second transmission, from the terminal device to the network node, comprises a report message containing the detected synchronization sequence block parameters or properties. The report message may be event-driven, or periodic, for example.

Figure 8:
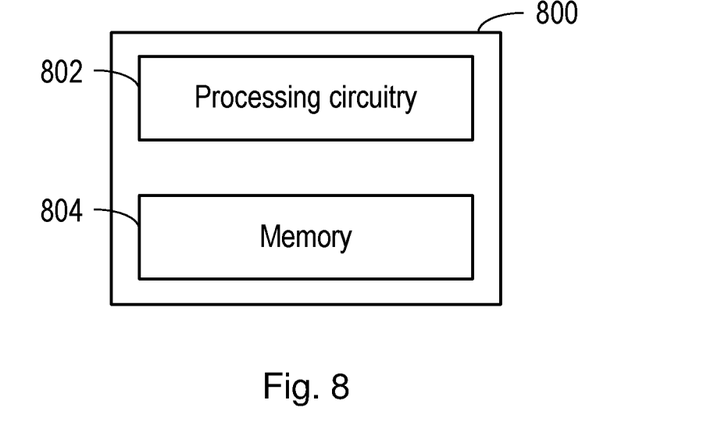
FIG. 8 is a schematic diagram of a terminal device according to embodiments of the disclosure.

FIG. 8 is a schematic diagram of a terminal device 800 according to embodiments of the disclosure. For example, the terminal device 800 may correspond to the terminal device 316 described above. The terminal device 800 may be suitable for performing the method described above with respect to FIG. 4.

The terminal device 800 may be suitable for a wireless communications network in which a plurality of radio access nodes are operative.

The terminal device 800 comprises processing circuitry 802 and a non-transitory machine-readable medium 804 (such as memory) which is coupled to the processing circuitry 802. The machine-readable medium 804 comprises instructions which, when executed by the processing circuitry 802, cause the terminal device 800 to: detect one or more parameters of synchronization sequence, SS, blocks transmitted by a second radio access node of the plurality of radio access nodes; and report the detected one or more parameters of SS blocks transmitted by the second radio access node to a first radio access node of the plurality of radio access nodes.

The terminal device 800 may also generally comprise interface circuitry (i.e. hardware and/or software) for transmitting and receiving signals, such as one or more antennas, and transceiver circuitry coupled to the one or more antennas for transmitting and receiving wireless signals.

Figure 9:
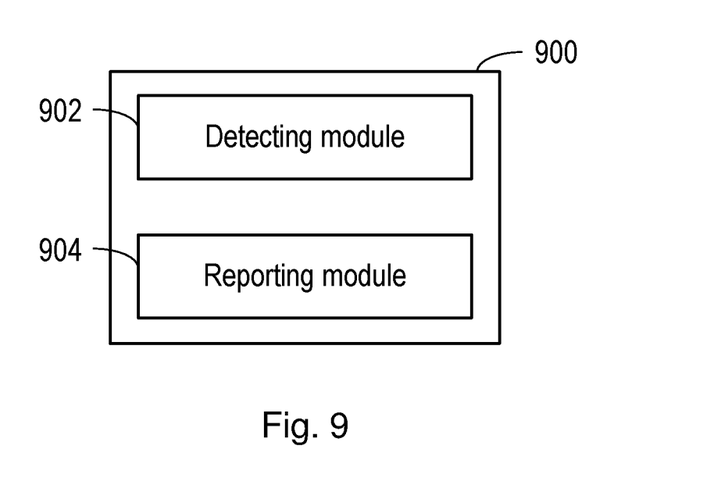
FIG. 9 is a schematic diagram of a terminal device according to further embodiments of the disclosure.

FIG. 9 is a schematic diagram of a terminal device 900 according to further embodiments of the disclosure. For example, the terminal device 900 may correspond to the terminal device 316 described above. The terminal device 900 may be suitable for performing the method described above with respect to FIG. 4.

The terminal device 900 may be suitable for a wireless communications network in which a plurality of radio access nodes are operative.

The terminal device 900 comprises a detecting module 902 and a reporting module 904. The detecting module 902 is configured to detect one or more parameters of synchronization sequence, SS, blocks transmitted by a second radio access node of the plurality of radio access nodes. The reporting module is configured to report the detected one or more parameters of SS blocks transmitted by the second radio access node to a first radio access node of the plurality of radio access nodes.

The terminal device 900 may also generally comprise hardware and/or modules for transmitting and receiving wireless signals, such as one or more antennas, and transceiver modules coupled to the one or more antennas.

Figure 10:
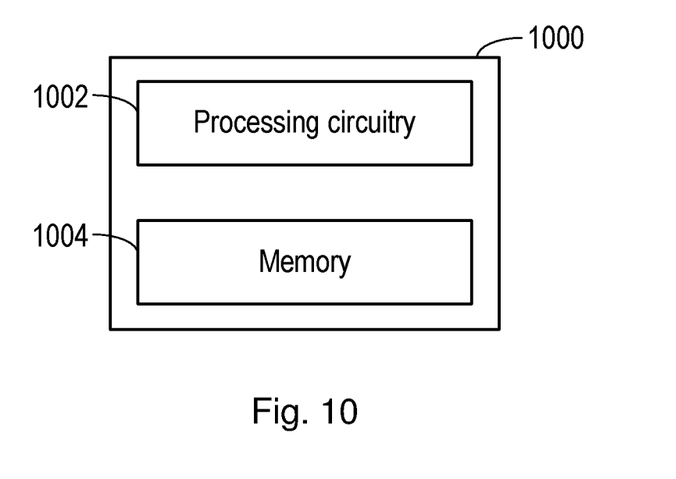
FIG. 10 is a schematic diagram of a network node according to embodiments of the disclosure.

FIG. 10 is a schematic diagram of a network node according to embodiments of the disclosure. The network node 1000 may be suitable to perform the method shown in and described with respect to FIG. 5, for example. The network node 1000 may correspond to a radio access network node, such as the network node 312 or 314 described above with respect to FIG. 3, or may correspond to a node which is connected to and controls such a radio access network node.

The network node 1000 comprises processing circuitry 1002 and a non-transitory machine-readable medium 1004 (such as memory) which is coupled to the processing circuitry 1002. The machine-readable medium 1004 comprises instructions which, when executed by the processing circuitry 1002, cause the network node 1000 to: instruct a terminal device to detect and report one or more properties of synchronization sequence, SS, blocks transmitted by a second network node operative in the wireless communication network; and receive, from the terminal device, a report comprising the detected one or more properties of SS blocks transmitted by the second network node.

The network node 1000 may also generally comprise interface hardware and/or software for transmitting and receiving signals, such as one or more antennas, and transceiver circuitry coupled to the one or more antennas for transmitting and receiving wireless signals, or optical and/or electrical modules for transmitting and receiving optical or electrical signals.

Figure 11:
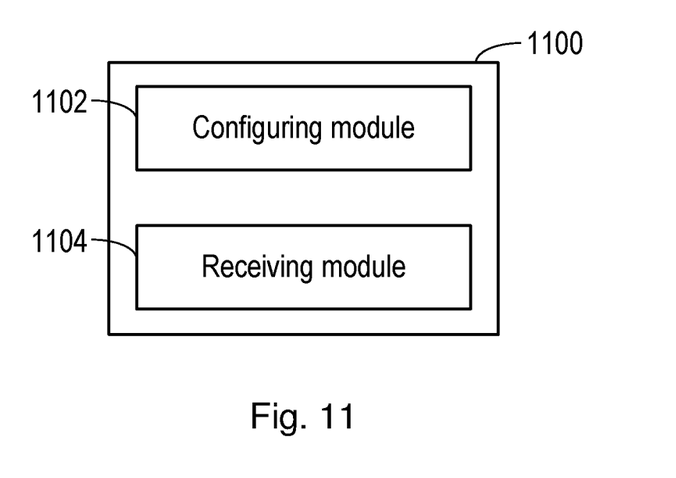
FIG. 11 is a schematic diagram of a network node according to further embodiments of the disclosure.

FIG. 11 is a schematic diagram of a network node according to embodiments of the disclosure. The network node 1100 may be suitable to perform the method shown in and described with respect to FIG. 5, for example. The network node 1100 may correspond to a radio access network node, such as the network node 312 or 314 described above with respect to FIG. 3, or may correspond to a node which is connected to and controls such a radio access network node.

The network node 1100 comprises an instructing or configuring module 1102 and a receiving module 1104. The instructing module 1102 is configured to instruct a terminal device to detect and report one or more properties of synchronization sequence, SS, blocks transmitted by a second network node operative in the wireless communication network. The receiving module 1104 is configured to receive, from the terminal device, a report comprising the detected one or more properties of SS blocks transmitted by the second network node.

The network node 1100 may also generally comprise one or more interface modules for transmitting and receiving signals, such as one or more antennas, and transceiver circuitry coupled to the one or more antennas for transmitting and receiving wireless signals, or optical and/or electrical modules for transmitting and receiving optical or electrical signals.

Thus the disclosure provides methods and apparatus for the detection of synchronization sequence block parameters transmitted by neighbouring cells or carriers.

It should be noted that the above-mentioned embodiments illustrate rather than limit the concepts disclosed herein, and that those skilled in the art will be able to design many alternative embodiments without departing from the scope of the appended following statements. The word "comprising" does not exclude the presence of elements or steps other than those listed in a statement, "a" or "an" does not exclude a plurality, and a single processor or other unit may fulfil the functions of several units recited in the statements. Any reference signs in the statements shall not be construed so as to limit their scope.

The following numbered statements set out embodiments of the disclosure:

1. A method in a terminal device for a wireless communication network, wherein a plurality of radio access nodes are operative in the wireless communication network, the method comprising:
   detecting one or more parameters of synchronization sequence, SS, blocks transmitted by a second radio access node of the plurality of radio access nodes; and
   reporting the detected one or more parameters of SS blocks transmitted by the second radio access node to a first radio access node of the plurality of radio access nodes.

2. The method according to paragraph 1, wherein the SS blocks are transmitted by the second radio access node in periodic SS bursts, each burst comprising one or more SS blocks.

3. The method according to paragraph 2, wherein the SS bursts are transmitted by the second radio access node in periodic SS burst sets, each SS burst set comprising one or more SS bursts.

4. The method according to any one of the preceding paragraphs, wherein the one or more parameters comprise one or more of: a start time of the SS burst set compared to a timing reference; periodicity of SS burst sets; the number of SS Bursts per SS burst set; the number of SS blocks per SS burst; the periodicity of SS bursts within an SS burst set; and one or more frequencies over which the SS blocks are transmitted.

5. The method according to paragraph 4, wherein the reference is a system frame number of a serving radio access node.

6. The method according to any one of the preceding paragraphs, wherein detecting one or more parameters comprises:
   listening for the transmission of SS blocks during a finite time window.

7. The method according to paragraph 6, wherein the finite time window has a length equal to a sum of a maximum permitted periodicity and an additional time duration.

8. The method according to paragraph 7, wherein the additional time duration is configured with a value between 0 and the maximum permitted periodicity.

9. The method according to any one of paragraphs 6 to 8, wherein the finite time window starts upon reception of an SS block from a serving radio access node of the terminal device.

10. The method according to paragraph 9, wherein the first radio access node is the serving radio access node of the terminal device.

11. The method according to any one of the preceding paragraphs, wherein detecting one or more parameters comprises:
    determining the one or more parameters based on system information transmitted by the second radio access node.

12. The method according to any one of the preceding paragraphs, wherein detecting one or more parameters comprises:
    listening for the transmission of SS blocks and inferring the one or more parameters based on the detected SS blocks.

13. The method according to any one of the preceding paragraphs, wherein detecting one or more parameters comprises:
    listening for the transmission of SS blocks on multiple frequencies.

14. The method according to any one of the preceding paragraphs, further comprising:
    receiving an instruction to detect and report one or more parameters of the SS blocks transmitted by the second radio access node.

15. The method according to paragraph 14, wherein the instruction is received via wireless signaling from the first radio access node.

16. The method according to paragraph 15, wherein the wireless signaling comprises radio resource control, RRC, signaling.

17. The method according to any one of paragraphs 14 to 16, wherein the instruction comprises an indication of the one or more parameters.

18. The method according to any one of paragraphs 14 to 17, wherein the instruction comprises a configuration to detect and report one or more parameters of the SS blocks transmitted by the second radio access node.

19. The method according to paragraph 18, wherein the terminal device is configured to report the detected one or more parameters of SS blocks responsive to detection of an event.

20. The method according to paragraph 19, wherein the event comprises initial detection of a cell.

21. The method according to paragraph 18, wherein the configuration comprises a measurement object to measure one or more frequencies.

22. The method according to paragraph 18 or 21, wherein the configuration comprises a measurement object to measure one or more cells.

23. The method according to any one of paragraphs 14 to 17, wherein the instruction comprises a request to detect and report one or more parameters of the SS blocks transmitted by the second radio access node.

24. The method according to any one of the preceding paragraphs, wherein the step of reporting comprises transmitting a report message to the first radio access node, the report message comprising an indication of the detected one or more parameters of SS blocks transmitted by the second radio access node.

25. The method according to paragraph 24, wherein the report message comprises an RRC message.

26. A method in a first network node operative in a wireless communication network, the method comprising:
 instructing a terminal device to detect and report one or more properties of synchronization sequence, SS, blocks transmitted by a second network node operative in the wireless communication network; and
 receiving, from the terminal device, a report comprising the detected one or more properties of SS blocks transmitted by the second network node.

27. The method according to paragraph 26, wherein the SS blocks are transmitted by the second radio access node in periodic SS bursts, each burst comprising one or more SS blocks.

28. The method according to paragraph 27, wherein the SS bursts are transmitted by the second radio access node in periodic SS burst sets, each SS burst set comprising one or more SS bursts.

29. The method according to any one of paragraphs 26 to 28, wherein the one or more parameters comprise one or more of: a start time of the SS burst set compared to a timing reference; periodicity of SS burst sets; the number of SS Bursts per SS burst set; the number of SS blocks per SS burst; the periodicity of SS bursts within an SS burst set; and one or more frequencies over which the SS blocks are transmitted.

30. The method according to paragraph 29, wherein the reference is a system frame number of a serving radio access node.

31. The method according to any one of paragraphs 26 to 30, wherein the step of instructing comprises transmitting an instruction to the terminal device via wireless signaling to detect and report one or more properties of SS blocks transmitted by the second network node.

32. The method according to paragraph 31, wherein the wireless signaling comprises radio resource control, RRC, signaling.

33. The method according to paragraphs 31 or 32, wherein the instruction comprises an indication of the one or more parameters.

34. The method according to any one of paragraphs 31 to 33, wherein the instruction configures the terminal device to detect and report one or more parameters of the SS blocks transmitted by the second radio access node.

35. The method according to paragraph 34, wherein the instruction configures the terminal device to report the detected one or more parameters of SS blocks responsive to detection of an event.

36. The method according to paragraph 35, wherein the event comprises initial detection of a cell.

37. The method according to paragraph 34, wherein the instruction configures the terminal device with a measurement object to measure one or more frequencies.

38. The method according to paragraph 34 or 37, wherein the instruction configures the terminal device with a measurement object to measure one or more cells.

39. The method according to any one of paragraphs 31 to 33, wherein the instruction comprises a request to detect and report one or more parameters of the SS blocks transmitted by the second radio access node.

40. The method according to any one of paragraphs 26 to 39, wherein the report comprises an RRC message.

41. The method according to any one of paragraphs 26 to 40, further comprising:
 informing one or more further terminal devices of the detected one or more properties of SS blocks transmitted by the second network node.

42. A terminal device for a wireless communication network, wherein a plurality of radio access nodes are operative in the wireless communication network, the terminal device being configured to:
 detect one or more parameters of synchronization sequence, SS, blocks transmitted by a second radio access node of the plurality of radio access nodes; and
 report the detected one or more parameters of SS blocks transmitted by the second radio access node to a first radio access node of the plurality of radio access nodes.

43. The terminal device according to paragraph 42, wherein the terminal device is further configured to perform the method according to any one of paragraphs 2 to 25.

44. A terminal device for a wireless communication network, wherein a plurality of radio access nodes are operative in the wireless communication network, the terminal device comprising processing circuitry and a non-transitory machine-readable medium storing instructions which, when executed by the processing circuitry, cause the terminal device to:
 detect one or more parameters of synchronization sequence, SS, blocks transmitted by a second radio access node of the plurality of radio access nodes; and
 report the detected one or more parameters of SS blocks transmitted by the second radio access node to a first radio access node of the plurality of radio access nodes.

45. The terminal device according to paragraph 44, wherein the terminal device is further caused to perform the method according to any one of paragraphs 2 to 25.

46. A terminal device for a wireless communication network, wherein a plurality of radio access nodes are operative in the wireless communication network, the terminal device comprising:
 a detection module configured to detect one or more parameters of synchronization sequence, SS, blocks transmitted by a second radio access node of the plurality of radio access nodes; and
 a reporting module configured to report the detected one or more parameters of SS blocks transmitted by the second radio access node to a first radio access node of the plurality of radio access nodes.

47. A network node for a wireless communication network, the network node being configured to:
 instruct a terminal device to detect and report one or more properties of synchronization sequence, SS, blocks transmitted by a second network node operative in the wireless communication network; and
 receive, from the terminal device, a report comprising the detected one or more properties of SS blocks transmitted by the second network node.

48. The network node according to paragraph 47, wherein the network node is further configured to perform the method according to any one of paragraphs 27 to 41.

49. A network node for a wireless communication network, the network node comprising processing circuitry and a non-transitory machine-readable medium storing instructions which, when executed by the processing circuitry, cause the network node to:
  instruct a terminal device to detect and report one or more properties of synchronization sequence, SS, blocks transmitted by a second network node operative in the wireless communication network; and
  receive, from the terminal device, a report comprising the detected one or more properties of SS blocks transmitted by the second network node.

50. The network node according to paragraph 49, wherein the network node is further caused to perform the method according to any one of paragraphs 27 to 41.

51. A network node for a wireless communication network, the network node comprising:
  an instructing module configured to instruct a terminal device to detect and report one or more properties of synchronization sequence, SS, blocks transmitted by a second network node operative in the wireless communication network; and
  a receiving module configured to receive, from the terminal device, a report comprising the detected one or more properties of SS blocks transmitted by the second network node.

The invention claimed is:

1. A method in a user equipment for a wireless communication network a plurality of base stations operative in the wireless communication network, the method comprising:
  detecting one or more parameters of synchronization sequence (SS) blocks transmitted by a second base station of the plurality of base stations; and
  reporting the detected one or more parameters of SS blocks transmitted by the second base station to a first base station of the plurality of base stations;
  the SS blocks being transmitted by the second base station in periodic SS bursts, each burst comprising one or more SS blocks, the SS bursts being transmitted by the second base station in periodic SS burst sets, each SS burst set comprising one or more SS bursts, and the one or more parameters comprising one or more of:
  periodicity of SS burst sets; a number of SS Bursts per SS burst set; a number of SS blocks per SS burst; a periodicity of SS bursts within an SS burst set; and one or more frequencies over which the SS blocks are transmitted.

2. The method according to claim 1, wherein detecting one or more parameters comprises:
  listening for the transmission of SS blocks during a finite time window that has a length equal to a sum of a maximum permitted periodicity and an additional time duration.

3. The method according to claim 1, wherein detecting one or more parameters comprises:
  determining the one or more parameters based on system information transmitted by the second base station.

4. The method according to claim 1, wherein detecting one or more parameters comprises:
  listening for the transmission of SS blocks and inferring the one or more parameters based on the detected SS blocks.

5. The method according to claim 1, further comprising:
  receiving an instruction to detect and report one or more parameters of the SS blocks transmitted by the second base station.

6. The method according to claim 5, wherein the instruction comprises a configuration to detect and report one or more parameters of the SS blocks transmitted by the second base station.

7. A method in a first base station operative in a wireless communication network, the method comprising:
  instructing a user equipment to detect and report one or more properties of synchronization sequence (SS) blocks transmitted by a second base station operative in the wireless communication network; and
  receiving, from the user equipment, a report comprising detected one or more properties of SS blocks transmitted by the second base station;
  the SS blocks being transmitted by the second base station in periodic SS bursts, each burst comprising one or more SS blocks, the SS bursts being transmitted by the second base station in periodic SS burst sets, each SS burst set comprising one or more SS bursts, and the one or more properties comprising one or more of:
  a periodicity of SS burst sets; a number of SS Bursts per SS burst set; a number of SS blocks per SS burst; a periodicity of SS bursts within an SS burst set; and one or more frequencies over which the SS blocks are transmitted.

8. The method according to claim 7, wherein the step of instructing comprises transmitting an instruction to the user equipment via wireless signaling to detect and report one or more properties of SS blocks transmitted by the second base station.

9. The method according to claim 8, wherein the instruction configures the user equipment to detect and report one or more parameters of the SS blocks transmitted by the second base station, or configures the user equipment with a measurement object to measure one or more frequencies, or one or more cells.

10. A user equipment for a wireless communication network, the user equipment comprising processing circuitry and a non-transitory machine-readable medium storing instructions which, when executed by the processing circuitry, cause the user equipment to:
  detect one or more parameters of synchronization sequence (SS) blocks transmitted by a second base station; and
  report the detected one or more parameters of SS blocks transmitted by the second base station to a first base station;
  the SS blocks being received from the second base station in periodic SS bursts, each burst comprising one or more SS blocks, the SS bursts being received from the second base station in periodic SS burst sets, each SS burst set comprising one or more SS bursts, and the one or more parameters comprising one or more of: a periodicity of SS burst sets; a number of SS Bursts per SS burst set; a number of SS blocks per SS burst; a periodicity of SS bursts within an SS burst set; and one or more frequencies over which the SS blocks are transmitted.

11. The user equipment according to claim 10, wherein the user equipment is configured to detect one or more parameters by:
  listening for the transmission of SS blocks during a finite time window that has a length equal to a sum of a maximum permitted periodicity and an additional time duration.

12. The user equipment according to claim 11, wherein the additional time duration is configured with a value between 0 and the maximum permitted periodicity.

13. The user equipment according to claim 11, wherein the finite time window starts upon reception of an SS block from a serving base station of the user equipment.

14. The user equipment according to claim 10, wherein the user equipment is configured to detect one or more parameters by:
   determining the one or more parameters based on system information transmitted by the second base station.

15. The user equipment according to claim 10, wherein the user equipment is configured to detect one or more parameters by:
   listening for the transmission of SS blocks and inferring the one or more parameters based on the detected SS blocks.

16. The user equipment according to claim 10, wherein the user equipment is further configured to:
   receive an instruction to detect and report one or more parameters of the SS blocks transmitted by the second base station.

17. The user equipment according to claim 16, wherein the instruction comprises a configuration to detect and report one or more parameters of the SS blocks received from by the second base station.

18. A base station for a wireless communication network, the base station comprising processing circuitry and a non-transitory machine-readable medium storing instructions which, when executed by the processing circuitry, cause the base station to:
   instruct a user equipment to detect and report one or more properties of synchronization sequence (SS) blocks transmitted by a second base station operative in the wireless communication network; and
   receive, from the user equipment, a report comprising the detected one or more properties of SS blocks transmitted by the second base station;
   the SS blocks being transmitted by the second base station in periodic SS bursts, each burst comprising one or more SS blocks, the SS bursts being transmitted by the second base station in periodic SS burst sets, each SS burst set comprising one or more SS bursts, and the one or more properties comprising one or more of:
   a periodicity of SS burst sets; a number of SS Bursts per SS burst set; a number of SS blocks per SS burst; a periodicity of SS bursts within an SS burst set; and one or more frequencies over which the SS blocks are transmitted.

19. The base station according to claim 18, wherein the base station is
   caused to instruct the user equipment by transmitting an instruction to the user equipment via wireless signaling to detect and report one or more properties of SS blocks transmitted by the second base station.

20. The base station according to claim 19, wherein the instruction configures the user equipment to detect and report one or more parameters of the SS blocks transmitted by the second base station.

21. The base station according to claim 19, wherein the instruction configures the user equipment with a measurement object to measure one or more frequencies, or one or more cells.

22. The base station according to claim 18, wherein the base station is further caused to:
   inform one or more further user equipments of the detected one or more properties of SS blocks transmitted by the second base station.

23. The method of claim 1, wherein the timing reference for the first base station is a system frame number for the first base station.

24. The method of claim 7, wherein the timing reference for the first base station is a system frame number for the first base station.

25. The user equipment of claim 10, wherein the timing reference for the first base station is a system frame number for the first base station.

26. The base of claim 18, wherein the timing reference for the base station is a system frame number for the base station.

* * * * *